Jan. 11, 1966     H. I. MAHON     3,228,876
PERMEABILITY SEPARATORY APPARATUS PERMEABILITY SEPARATORY
MEMBRANE ELEMENT, METHOD OF MAKING THE SAME AND PROCESS
UTILIZING THE SAME

Filed Sept. 19, 1960     2 Sheets-Sheet 1

INVENTOR
HENRY I. MAHON,
BY
ATTORNEY

United States Patent Office 3,228,876
Patented Jan. 11, 1966

3,228,876
PERMEABILITY SEPARATORY APPARATUS, PERMEABILITY SEPARATORY MEMBRANE ELEMENT, METHOD OF MAKING THE SAME AND PROCESS UTILIZING THE SAME
Henry I. Mahon, Walnut Creek, Calif., assignor to The Dow Chemical Company, Midland, Mich., a corporation of Delaware
Filed Sept. 19, 1960, Ser. No. 57,055
27 Claims. (Cl. 210—22)

This invention relates to permeability separatory apparatus and to the use of such apparatus to selectively resolve the different components of multi-component fluids.

The invention further relates more specifically to permeability separatory membrane elements comprised of a multiplicity of substantially parallel, thin, continuously hollow fibers in bundled relationship and to methods of making same for use in a permeability separatory apparatus.

In the course of development of laboratory and commercial separatory procedures a wide variety of generic systems of separation have been utilized, including such common expedients as filtration, evaporation and distillation. While these processes are commercially practicable for many separatory operations, they are oftentimes totally inadequate in numerous other similar operations. The effects of one or more of such factors as cost, bulk, elevated temperature destruction of separable components, low operating efficiency and the like are responsible for the shortcoming. Additionally, in many instances, such processes are incapable of separating the desired fluid components.

In consequence, there has been for many years a concentrated effort to use semipermeable membranes as a separatory means. The already developed art encompasses a diversity of known membranes which have, to a greater or lesser degree, the property of being selectively permeable to different components of fluid mixtures. Thus, some membranes (of the type that are referred to as osmotic membranes) will pass water but restrain ions. Other membranes will selectively pass ions in solution. These are usually known as being ion exchange membranes. Still other membranes possess selective permeation rates for two or more non-ionic components of fluid mixtures. Yet additional types of membranes are of the so-called molecular sieve type (such as those utilized for dialysis), which can pass ions or other materials but tend to restrain passage of high molecular weight components or, similarly, which are adapted to pass only certain molecular weight fractions of given materials, depending on actual molecular size and proportions.

Despite the recognition of the inherent advantages that are achievable with permeability separatory apparatus, commercial adoption of such devices has been undertaken on only a very limited scale. The common inherent limitation that seems to militate against more widespread employment of the prior permeability separatory procedures has been the slow and relatively inefficient (at least for commercial purposes) rate of transfer of the desired component from one side of the membrane to the other.

The rate equation describing the flow of liquid through a membrane follows the general form of rate equations for mass transfer; i.e., Rate of mass transfer = Permeability Constant
$\times$ Area $\times$ Driving Force $\times \dfrac{1}{\text{Resistance}}$ In this equation, the permeability constant depends on the material used in the membrane. Satisfactory choice of material for given purposes is determined to some extent by this factor. Suitable materials for various membranes are hereinafter more fully disclosed. The permeability constant also varies with the composition of the component to be separated, as well as its concentration in the untreated fluid. In this connection, it is normally found to be inexpedient or prohibitively expensive, or both, to vary this composition or concentration.

Thus, as is readily apparent, the optimum rate to be obtained in a given membrane transfer process will result when the area and/or driving force are maximized and the resistance minimized.

It is an object of the present invention to provide a process and apparatus facilitating achievement of the above delineated optimums. More particularly, it is an object of the present invention to provide a permeability separatory apparatus and method of using the same which optimizes the mentioned variables.

This and other objectives, and cognate benefits and advantages, are possibilitated and achieved by means of a specific cell that incorporates a specific membrane element comprising a multiplicity of substantially unsupported, fine, continuously hollow fiber and, even more advantageously for most purposes a multiplicity of bundles of a substantially parallel plurality of such fibers in which the thin wall of each of the hollow fibers employed forms the transfer membrane area in and for the cell or element, all as hereinafter more partcicularly described and specified.

Prior art permeability membranes have consisted, for the most part, of thin, uniplanar plates rigidly supported on solid backing members. Obviously, in such apparatus, a plate of exceedingly large area or large pluralities of such uniplanar plates are necessary to achieve practical transfer rates. Additionally, in such installations, the backing plates take up space in considerable proportion and may be considered, at best, as mere "dead" weight. Besides, due to the necessary construction of such apparatus, the membranes tend to be relatively weak and susceptible to rupture in use.

Practice of the present invention, however, allows permeability separatory apparatus to be used for any of a wide variety of applications in which, as compared to previously known developments, great advantage can be derived from installations characterized in having exceedingly large transfer areas for given volumes of space occupied by the apparatus. Such an objective is readily accomplishable with the present membrane elements wherein, most beneficially, very large bundles of any desired plurality, even up to a million or more, of the hollow fibers that form the transfer area can be maintained, if desired, in spaces having cross sections no greater than an inch or so of width or diameter. The ratio of transfer area to apparatus volume achievable by present practice is invariably many times (and significantly) greater than may be had by following of prior art techniques. For example, practice in accordance with the present contribution to the art permits installations to be employed that have surface areas for transfer of material to be separated that are as much as ten thousand square feet (10,000 ft.²) or more per cubic foot (ft.³') of volume actually occupied by the installation. This represents a transfer area to apparatus volume ratio that is greater by a factor of at least 30 than the same characteristic in conventional apparatus for the same purpose, wherein (depending somewhat on the type and configuration of the backing plates or other supports used for the membrane) the apparatus may provide only three hundred square feet (300 ft.²) or less per cubic foot (ft.³) of installation. Furthermore, surprising as it may seem, the thin-walled hollow fibers used in the present membrane elements achieve much greater membrane strength than is possible in prior art membranes having different configurations. This nicely overcomes difficulties occasioned by the requisite use, for purposes of adequate strength, of relatively thicker membrane materials. At the same time, backing plates and equivalent types of membrane supports are, as indicated, eliminated and avoided in the hollow fiber membrane elements of the invention.

One of the more promising applications of permeability separation has long been regarded as that of reverse osmosis, or ultrafiltration. If, for example, a fluid that contains water as a solvent with ions in solution therein is placed on one side of an osmotic membrane, and the solvent (i.e., water) is placed on the other side of the membrane, the solvent will pass through the membrane into the ionic solution. The force causing this transfer varies with the character and concentration of the fluid involved. Nevertheless, such force is a measurable pressure for any given composition and concentration and membrane structure.

If there is now applied to the ionic solution a pressure in excess of its specific osmotic pressure, there is produced the process of reverse osmosis or ultrafiltration. In this phenomenon, solvent from the ionized solution is forced through the membrane while the ions are rejected by the membrane. The exact mechanics of such a process are not absolutely known or determined. Whatever its cause or modus operandi, however, the reverse osmosis process functions at the prescribed pressures for almost all fluids, given an appropriate choice of membrane material.

The pressures required to produce reverse osmosis are, in most instances, substantial. In fact, for most commercial aqueous ionic solutions, a minimum of one hundred pounds per square inch is required to secure the desired reverse osmosis. Since the rate of mass transfer is directly proportional to pressure, it is easily evident that pressures of many hundreds of pounds per square inch are required to expeditiously use reverse osmosis. Such pressures, when utilized with uniplanar plate membranes, require that a difficult and expensive mechanism or backing plate for adequately supporting the membrane be utilized.

To attempt to lessen the shortcomings of the uniplanar membranes, tubular membranes having coextensive tubular backing or supporting elements have been utilized. Such tubular members are, by virtue of the laws of fluid pressure, better adapted to withstand higher pressures than the uniplanar membranes. However, these prior art tubular membranes again do not furnish sufficient area to make the rate of transfer high enough to be commercially feasible. And, at least as significant, they are also necessarily mechanically supported membranes having associated difficulties for such reason commensurate with those above described in connection with supported uniplanar membranes.

The deficiencies of the prior art are overcome by the structure and method of the present invention which comprises essentially a permeability apparatus formed of a cell or cells incorporating in each cell, a multiplicity of bundles each consisting of a multiplicity of fine hollow fibers supported only at their terminal portions.

An even more complete understanding of the nature and objects of the invention is afforded by reference to the accompanying drawing in connection with the following description and specification, wherein.

Figure 1:
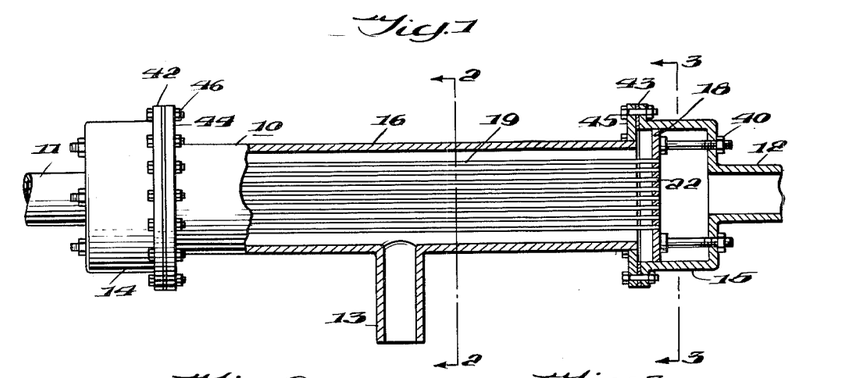
FIGURE 1 is a broken out elevational view, partly in section, of the overall structure of one embodiment of one of the permeability cells in accordance with the present invention.
Figure 2:
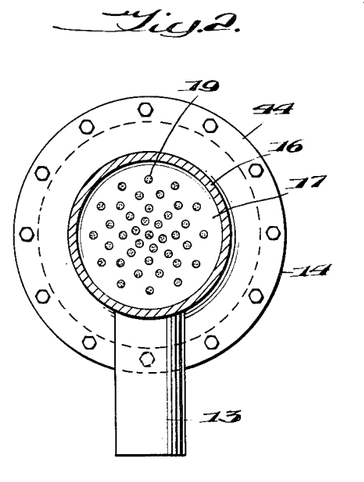
FIGURE 2 is a cross-sectional view of the cell taken along 2—2 in FIGURE 1 with the locking plate omitted for clarity.
Figure 3:
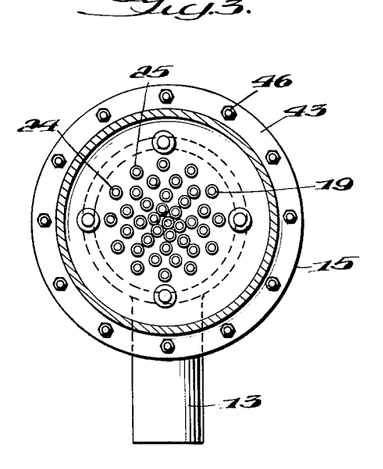
FIGURE 3 is a cross-sectional view of the end of the cell taken along 3—3 in FIGURE 1.

Referring first to FIGURE 1, there is shown the overall structure of one embodiment of the basic permeability cell of the present invention. This is generally designated, in its entirety, by reference numeral 10. The cell 10 includes an inlet 11 for untreated fluid having means such as a pump or the like, not shown, to apply a desired fluid pressure to fluid entering inlet 11, and an outlet 12 for the discharge of the treated fluid. An additional outlet 13 is formed for discharge of the fluid component after it has passed through the permeable membranes of the cell. At the entrance end the inlet 11 feeds a header chamber 14. At the exit end there is positioned a second header chamber 15 which feeds the outlet 12. Situated between headers 14 and 15 and supporting the same as a casing 16. Advantageously, the casing 16 is tubular, although it may have other desired configuration. The casing 16 is sealed at its end from headers 14 and 15 by means of header end plates 17 and 18. Outlet 13 provides an exit for fluid accumulated in the casing 16.

Positioned within the casing 16 are a multiplicity of bundles 19 of hollow, fine fibers 20. The nature of the hollow fibers 20 is hereinafter described in greater detail.

Figure 4:
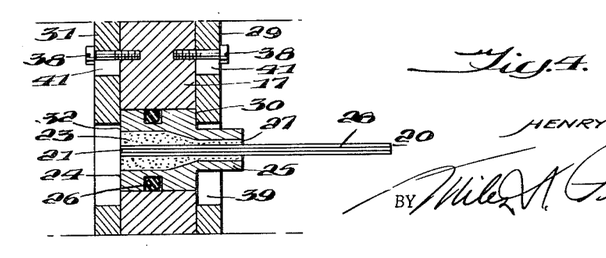
FIGURE 4 shows a preferred embodiment of the end seal for a hollow fiber bundle.

As is best shown in FIGURES 1 and 4, each of the bundles 19 has its terminal portions 21, 22 sealed in openings in the end plates 17, 18 by means of a suitable adhesive or cement, resin or the like, indicated generally at 23. The bundles 19 are thus supported at their terminal portions only by the header plates. In this way, the opposite open ends of the many small hollow fibers are all in fluid communication with the header chambers 14 and 15. Each of the hollow fibers 20 in each bundle 19 has the same or about the same length. Likewise, it is generally desirable for the other dimensioned parameters of all the hollow fibers in each bundle (i.e., outside diameter and wall thickness) to be the same in each fiber although, if desired, bundles of fibers having different individual outside diameters and wall thicknesses may be employed. Similarly, each of the bundles 19 advantageously has the same dimensional parameters as the other bundles; i.e., the same length and outside diameters, although the latter of these can, if desired, also be varied in individual bundles. Thus it will be seen that each of the fibers has a uniform bore therethrough.

There is thus formed a permeability cell that includes a multiplicity of parallel, fine, hollow fibers each of which is supported only at its terminal portions and substantially unsupported throughout its length. Such a cell, as indicated, provides the maximum unimpaired transfer area for a given membrane material. The hollow fibers can withstand pressures of many hundreds of pounds per square inch and their wall thickness is so small that they present minimum resistance to passage of a permeable fluid component.

Referring to FIGURE 4, there is shown a preferred embodiment of an end seal for a hollow fiber bundle 19. The header end plate 17 has a plurality of apertures of which one is shown at 24. Fitted slidably within each of the apertures 24 is a coupling fitting 25. An O-ring 26 seals the joint between the end plate 17 and coupling 25.

A bundle of hollow fibers 19 is positioned within the bore 27 of coupling 25. The individual hollow fibers 20 in the bundle 19 are sealed on their exterior terminal por tions 28 only to each other and to the interior of bore 27 by means of a suitable cementitious material 23. Epoxy resin compositions are especially well suited for such purpose.

A sliding gate lock plate 29 having a plurality of fitting apertures 39 is slidably positioned parallel to the end plate 17 within header 14. The gate lock plate 29 is shown in locked position where it engages a projection or shoulder 30 on coupling 25. A similar slidable gate lock 31 is preferably positioned within header chamber 14 and on the side of header end plate 17 opposite to sliding gate lock plate 29. Gate lock 31 coacts with the end 32 of the fitting, although the high fluid pressure generally present in header chamber 14 may make this second lock unnecessary. Gate lock plates 29 and 31 are slidingly secured to header end plate 17 by headed studs 38 which extend through suitable slots 41 and are fixedly threaded into end plate 17 as shown in FIGURE 4. The heads of studs 38 engage the lock plates at each of the slot sides to secure the plates in position. Preferably the couplings 25 are inserted in apertures 24 and locked therein by gate lock plates 29 and 31 during assembly of the permeability cell, although it is contemplated that operating means (not shown) could extend outside of the cell through suitable seals so that the locks could be actuated externally of the cell.

The lock plates 29, 31 may be formed with a cam or other means to longitudinally adjustably position the coupling 25 in the end plates 17, 18. Or the entire end plate may be longitudinally adjustably positioned by any suitable means, such as positioning screws 40, shown in FIGURE 1. In this way, if desired, the tension upon the individual fiber bundles 19 may be varied although it is generally preferable to avoid application of positive drawing force on the fibers in the bundle in order to avoid difficulties from fiber breaks.

It will be understood that there is a similar aperture 24 and a similar coupling 25 for each of the hollow fiber bundles employed, and that the end seal and support structure is duplicated at the other header 15. This preferred embodiment presents a simple means for supporting and sealably positioning the individual bundles 19 of hollow fibers. Such an arrangement allows each bundle to be removed individually in the event of rupture or other damage to one of the bundles. Each bundle of fibers 19 together with its cementitiously terminally adjoined couplings 25, 25 in fluid-sealing relation forms a unitary permeability separatory element is best shown in FIGURE 5, additional details thereof being shown in FIGURES 6 and 7.

Figure 5:
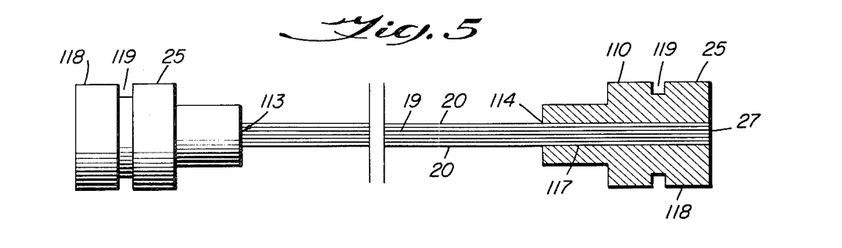
FIGURE 5 is a cross-sectional, longitudinal view of a permeability separatory element formed in accordance with the present invention.

Referring first to FIG. 5, there is shown one of the permeability separatory elements of this invention, designated in its entirety by 110. This element includes a multiplicity of fine, continuously hollow fibers 20, such fibers being formed into a bundle 19 of substantially parallel, equal length fibers. A more detailed description of the parameters and materials of the individual hollow fibers is contained hereinafter. Such a bundle 19 usually comprises at least many hundreds of the individual hollow fibers 20. Advantageously, each bundle has fibers in an amount of at least a thousand and, more advantageously, up to a million or more of such fibers therein.

The bundle 19 has two opposite terminal portions 113 and 114. Each of these terminal portions are surrounded by a fitting or coupling member 25, 25 having central bores or passages 27, 27 within which the terminal portions 113 and 114 are positioned. Preferably, the size of the bore 27 is chosen so as to be only slightly greater than the exterior dimensions of the terminal portions of the bundles. For most purposes it is preferred to form the exterior of the bundles and of the bores in tubular cross-sectional shape.

Each of the individual fibers 20 is cemented so as to be effectively sealed on its exterior terminal portions only to the exterior terminal portions only of adjacent individual fibers and/or to the interior wall 117 of bore 27, as indicated generally at 128. In any event, those fibers 20 of which are on the exterior of bundle 19 are cemented to the interior wall 117. It is important for satisfactory operation that effective sealing of the exterior end portions of the fibers is accomplished.

While any suitable cement such as phenolaldehydes, thermosetting artificial rubbers, acrylic resins or other liquid, settable organic cements may be utilized, it is generally preferred to use an epoxy resin as the sealant for the fibers. Many factors dictate the choice of proper cement. These include the choice of materials for the fibers 20 and for the coupling members 25, 25. Additionally, the cement chosen must be inert to chemical or solvent action by any of the components of the fluid with which it is to be used, and must, as indicated, provide a fluid-proof seal at the particular pressures and/or temperatures to which the permeability separatory apparatus is to be submitted.

Epoxy resins are particularly suitable for the indicated use because of their inertness to solvents and chemical corrosion and their ability to provide fluid-proof seals at the contemplated elevated pressures and/or temperatures. The cement 128, when set, fills the interstices between the exteriors of the individual fibers 20 and between the exteriors of the individual fibers and the interior wall 117 in fluid sealing relation. In this way, no fluid, except that which passes through the interiors of the hollow fibers, may through bore 27.

The fittings 25 are provided on their exterior surfaces 118, 118 with a groove or channel 119, 119 for a purpose described hereinafter. The bundle 19 of hollow fibers 20 with the end couplings 25 cemented thereto in fluid-sealing relation thus forms a unitary permeability separatory element, particularly adapted for use in the apparatus of the mentioned co-pending application.

Each of the header chambers 14 and 15 are formed with external circumferential flanges indicated at 42 and 43. These flanges coact in sealing relation, when the overall unit is assembled, with mating flanges 44 and 45 positioned on the exterior of casing 16. The flanges are held in sealing relation by means of bolts 46, or the like.

In assembling the apparatus, as thus far described, the individual bundles 19 are sealed, as previously delineated, to their individual end fittings 25, and these end fittings are assembled within the apertures in one of the end plates 17 or 18. This end plate is then positioned within its appropriate header chamber in sealing relation, and the bundles with their end portions 25 are led through chamber 16. With the end plates 17 and 18 held toward casing 16 within the header chambers, the opposite ends of the bundles are then positioned within the apertures of the other of the end plates. The sliding gate locks are reciprocated to engage the shoulders on the fittings 25 to lock them to the end plates 17 and 18. Subsequently, the header chambers are sealed to the casing by means of the above described flanges and bolts and, if desired, final adjustment of the tensioning of the bundles 19 is accomplished by means of the positioning screws 40 or their counterpart.

In most operations using permeability processes, rupture of one or of a small number of the individual membranes employed, whether they be uniplanar or tubular in construction, causes a lowering of the rejection factor of the separating apparatus which is so drastic in effect that the entire affected installation must ordinarily be shut down to replace the damaged membrane. Rupture of a single membrane in a plural membrane unit of conventional type generally lowers the rejection factor of the assembly to a far greater extent than can be tolerated for most separations. Thus, the utility of the entire permeability apparatus is disrupted. Under such circumstances, the permeate material must usually be discarded or recycled through properly operating units. Such is not the case when utilizing permeability apparatus in accordance with the present invention. Each of the bundles in the fluid separating units thereof comprises, as has been indicated, many thousands or even millions of fine, hollow fibers. Thus, rupture of a single fiber in a bundle brings about only an insignificant drop in the rejection factor of the separating unit. Moreover, since apparatus constructed in accordance with the present invention tends to circumvent the factors that cause rupture in conventionally assembled membranes, it is unlikely that an intolerably large proportion of fibers in any given bundle will occur so long as the applied pressure does not exceed the design capacity of the hollow fibers employed. As a matter of fact, cells made according to the invention are capable of performing continuously under high pressure for periods of many months, even years, without significant reduction of the rejection factor.

Reference will now be made to the process by which the permeability separatory elements 110 are manufactured in accordance with the present invention.

A multiplicity of continuously hollow, fine fibers of substantially equal, uniform dimensions, including length, are assembled in a bundle 19 preferably consisting of several hundred to thousands or a million or more individual fibers. In these bundles, the fibers are positioned in substantially parallel relation with their terminal portions 113 ending in a common plane. This bundle may have an elastic element or the like (not shown in the drawing) positioned therearound to temporarily hold the fibers in the assembled bundle, this element being removed after final assembly discussed hereinafter.

Figure 6:
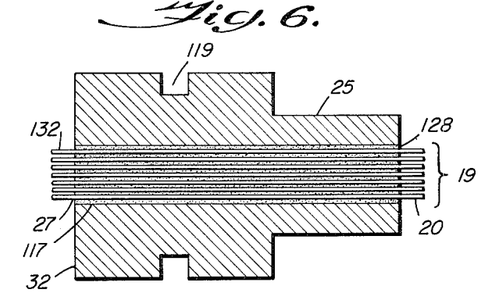
FIGURE 6 is a cross-sectional view of one of the terminal portions of the bundle of hollow fibers during the process of assembly of the present invention.

The bundle 19 is then threaded through bore 27 of coupling member 25 with the end portions 132 of the individual fibers extending beyond the end wall 32 of coupling 25, as shown in FIGURE 6. The exteriors of the fibers can be cemented to each other and to the interior wall 117 of the bore 27 by dipping the entire assembly of the terminal portion of bundle 19 and fitting 25 into a suitable cement 128 having a composition such as described above, or, more advantageously, forcing the sealing cement into the bore 27 under pressure.

In either of these procedures, it may be found that some of the initially fluid cement will enter the bores of the hollow fine fibers, plugging the ends. Such action is probably augmented by capillary attraction.

One suitable technique for precluding entry of the cement into the ends of the hollow fibers so as to avoid the possibility of plugging is to first (prior to application of the sealing cement) fill the ends of the hollow fibers with a solid material that can be easily and readily removed therefrom after application of the cement. Advantageously, the removable material employed for temporary plugging of the hollow fiber ends is an inert substance of low melting variety, such as wax or the like, which can be easily gotten into the ends of the fibers and, after the cementing operation is completed, simply removed therefrom by a melting and draining operation. Or, if preferred, a fusible material dissolvable by a solvent not active on either the hollow fiber or the sealing cement may also be used for temporary plugging of the fiber ends, after which it is removed by dissolution in the suitable solvent.

Following cement applying step, the cement is either permitted or caused to harden. The hardening step may occur at room temperatures or, in the case of thermosetting resins, at appropriate elevated temperatures. After the cement has hardened, the ends 132 of the fibers 20 which project beyond end wall 32 are cut off. This may be done by any suitable cutting mechanism known to the art to produce the structure shown in FIGURE 7. It is preferred that a very sharp cutting tool (such as one that is comparable to a honed steel blade) be used. Such a means tends to positively prevent crushing together of the severed walls of the fibers.

Figure 7:
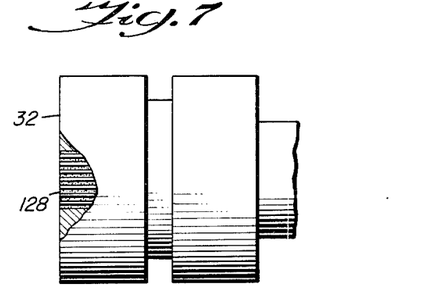
FIGURE 7 is a cross-sectional view of the same terminal portion as finally manfactured.

In cases where the hollow fibers are not temporarily plugged with wax or other easily removable substance prior to cementing, the length of end portions 132 which project beyond end 32 and which are severed is determined by the distance which the cement 128 penetrates the interiors of the hollow fibers 20. This distance will vary in accordance with the viscosity and composition of the cement and with the pressure, if any, applied to the cement. It will also vary in accordance with the composition and physical dimensions. As a consequence, it is a factor that is best determined emperically in individual situations. In any event, the projecting portions 132 should exceed in length the distance which the cement penetrates the bores of the hollow fibers so that when these ends are cut off the hollow fibers will all have open ended interiors.

Of course, there is no such problem when the fiber ends are temporarily plugged with wax or the like or equivalent substance prior to cementing, since the temporary filling of the fiber ends avoids the undesirable plugging of the fibers with the cement that is utilized. In such cases, the cemented hollow fibers need only be long enough to ensure their proper alignment in the coupling member 25, with any projecting portion being cut off as above described. After this, the temporary wax or other filling is removed by melting and draining or solvent dissolution thereof from the fiber ends. In this connection, the presence of a temporary wax or the like solid filling is also beneficial during any necessary cutting and trimming operation that is performed, since the temporary filling tends to even more positively reinforce the hollow fibers during the cutting so as to even better prevent crushing together of the severed fiber walls.

In an alternative procedure, suitable only where the exterior dimensions of bundle 19 closely approximate the interior dimension of bore 27 and where a cementitious composition of relatively high viscosity is utilized, the assembled bundle of hollow fine fibers may be dipped in the cement 128 and subsequently drawn through bore 27 so as to contact wall 117. Use of such a procedure (best employed when the interior ends of the hollow fibers is temporarily sealed with wax or another agent as above described) is contingent upon a sufficient amount of cement adhering to the exterior of the fibers of the bundles so as to provide a complete waterproof seal when the bundle is drawn through bore 27 in assembled relation with coupling 25. The remaining steps in this alternative procedure are identical with those discussed above: first, the cementitious material is caused to be hardened or set and, second, the projecting ends 132 are severed.

Still another technique which may be utilized to secure free fiber ends during and after the cement-applying step is to maintain the bundle being installed in a vertical position and to have it filled with a displacing fluid during application of the cement. This prevents the cement, such as a liquid epoxy resin, from dropping through or running up into the hollow fiber ends. Such a procedure, of course, also avoids any need for temporarily plugging the fiber ends with wax or the like since, after application and hardening of the cement, the displacing fluid is merely drained from the fibers prior to any necessary trimming that may be involved.

Yet another technique to avoid permanent plugging of the fiber ends with the cement during the cement-applying operation is to purge the hollow fibers with gas (preferably an inert gas such as nitrogen), then dip the unsealed assembly 25 with the fiber bundle 19 into the liquid cement composition employed with, advantageously, continuation of the gas purging. The gas in the fibers keeps the cement out of the hollow fiber ends but does not interfere with the actual cementing operation.

An additional technique for assembling the fibers which, in many instances, may advantageously be employed is to string the fiber bundle through a suitable mold form and cast an entire end fitting 25 about the bundle in the mold, using any suitable thermoplastic or other molding material for the purpose. After this, of course, the projecting ends of the hollow fibers in the bundle may be cleanly severed, as above indicated, along the outer face of the in situ-formed end fitting.

Whichever of the above procedures is used, it (or any suitable alternative) is substantially duplicated at the opposite terminal portion 114. There is thus produced the unitary permeability separatory element of the present invention consisting, most advantageously, of a bundle of a plurality of individual parallel, equal length hollow fibers having open ends and being joined to each other and to end coupling fittings on their exterior terminal portions only. The cement used for the jointing produces a fluid-proof seal between adjacent fibers and between the fibers and the interior walls of the fittings.

As is apparent, the permeability cells of the present invention, when utilized in pluralities in any given separating installation, may be connected in parallel relation or may be serially connected to further purify the separated component passed sequentially through the units. In such a serial battery, the outlet 13 of the first cell is connected to the inlet 11 of the second cell, etc.

Figure 8:
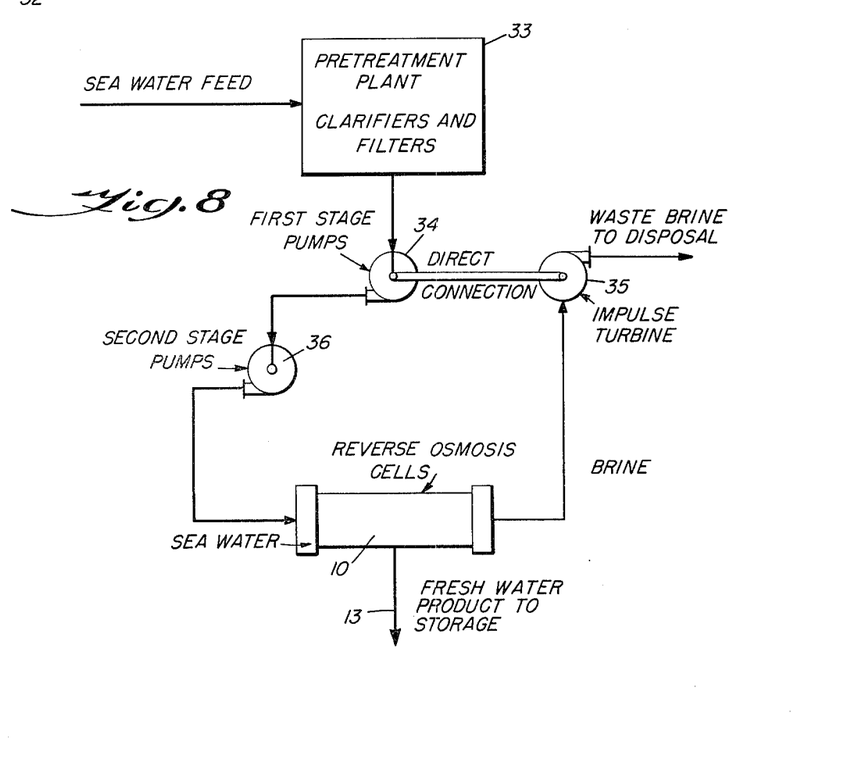
FIGURE 8 is a schematic flow diagram of a sea water conversion plant using the apparatus and process of the present invention.

There is shown in FIGURE 8 a preferred embodiment of a sea water conversion plant incorporating one or more of the cells described above.

Expansions in both population and more extensive resort to irrigation practice in recent years has placed greater emphasis on suitable techniques for the economical production of potable or agriculturally suitable water from the sea. Reverse osmosis is an attractive process for separation of water from sea water because of its potentially low energy requirements. In such an operation, sea water flows through a semi-permeable membrane and is collected relatively free of salt on the low pressure side thereof. Driving force for accomplishment of the desired procedure is provided by maintaining the pressure on the saline solution substantially above the osmotic pressure.

In spite of the general attractiveness of such operations, and despite concentrated efforts towards its practical realization, reverse osmosis (or ultrafiltration) has not generally been considered as an economical process for the recovery of fresh water from sea water. This is because of the low transfer rates obtainable from the prior art devices.

However, application of the present invention by means of the apparatus of FIGURE 8, including one or more of the permeability cells described above, offers a practical economical solution to salt water purification.

In the schematic flow diagram of FIGURE 8, the numeral 33 indicates a pretreatment plant of any suitable construction known to the art. Such pretreatment plants are usually comprised of various settling tanks, other clarifiers, filters, bacterial treatment units, etc. The raw sea water is fed to the pretreatment plant 33 and the treated effluent from plant 33 is led to a first stage pump 34. The first stage pump is preferably a low pressure unit connected directly mechanically to the output shaft of an impulse turbine 35 which is motivated by the energy from the moving stream of waste brine solution after its travel through the permeability apparatus. From the low pressure pump 34, the saline solution is fed to a second stage high pressure pump 36 which is fluid connected to the output of pump 34, driven by an electric motor or other suitable means. The saline solution under high pressure from the output second stage pump 36 is fluid connected to the inlet side 11 of a permeability cell 10 or to the inlets 11 of a battery of parallel connected cells 10 similar to those described above. Fresh water is discharged at the outlet 13 and, if desired, is further cycled through a battery of additional, serially connected permeability cells. The treated saline solution is led from the outlet 12 of the cell or cells to drive turbine 35. The waste brine solution from turbine 35 is led to a disposal area which can be the ocean or other source body of saline water.

In a typical sea water conversion plant patterned in accordance with the present invention along the lines above illustrated, an output of ten million gallons of fresh water contained in the sea water feed can readily be achieved. To attain this output, approximately 16,000 gallons per minute of sea water containing about 3.5 percent dissolved salt are fed to the pre-treatment plant. This solution, after passing through the pumps, is fed to the inlet of the permeability cells at a pressure of about 835 pounds per square inch. Brackish or incompletely desalted water, from which 95 percent of the initial salt content has been removed, is withdrawn from the parallel connected cells at a rate of approximately 7000 gallons per minute. The remaining treated brine issuing from the cells at the rate of about 9000 gallons per minute and at a pressure of about 700 pounds per square inch is used to drive the impulse turbine. This remainder is then led to the brine disposal outlet. If desired, the waste brine solution may be used as the starting material in an evaporative plant for saline solutions to further recover fresh water and to recover the salt content thereof.

Taking into account the amortized cost of the permeability cells and other components of this system, as well as the energy losses due to the pumping system and to the conversion of mechanical energy into thermal energy resulting from membrane forced flow and from friction, such a plant can produce fresh water from sea water on an economically attractive basis which is substantially less than can be afforded by heretofore known procedures.

The efficiency and economy of such a sea water conversion plant is determined to a large extent by the material of which the fine hollow fibers are constituted and by the dimensions of such fibers.

The choice of materials for this and all of the other processes described hereinafter to which the invention is applicable is, of course, dictated by the particular separatory process in which the permeability cells are to be utilized, including a consideration of the strength which is necessary to efficient process production. Among other factors which are determinative of the material chosen for a particular separatory process are: resistance to chemical reaction with the fluid components, specific and selective permeability constants of the material for the chosen fluid components at the chosen concentration, solubility or recrystallization of the membrane material in one or more of the fluid components, and cost of the membrane material. In addition, the membrane material chosen for use in the present invention must obviously be capable of formation into thin-walled, hollow fibers.

While the various materials meeting these criteria are known to the art and readily recognizable by the skilled worker, it is believed that a listing of those preferred materials which have been tested and found satisfactory for performance as wall membrane materials for the continuously hollow fibers of the permeability cells of the present invention will provide useful, specific working examples of the practical applications of the teachings of the present invention.

Where the permeability apparatus of this invention is to be utilized in the treatment of aqueous fluid compositions, particularly in procedures pertaining to osmosis, reverse osmosis, or dialysis, a variety of materials capable of formation into hollow fibers are suitable for use as membrane materials. Such materials are generally hydrophilic in character and include: cellulose esters such as cellulose acetate, triacetate, formate, propionate, nitrate or the like, including mono, di or tri esters and mixtures of such esters; cellulose ethers such as methyl, ethyl, hydroxy-alkyl, carboxy-alkyl, or the like, including mixed cellulose ethers; regenerated cellulose; polyvinyl alcohols; polysaccharides; casein and its derivatives; and similar hydrophilic polymeric materials such as certain forms of acrylonitrile polymers. Certain of these materials are more readily formed into fine, hollow fibers than others. A highly advantageous material for conversion into hollow fibers for use in practice of the invention is cellulose triacetate. Cellulose triacetate in hollow fiber form has excellent qualities of permeation, cost, strength and resistance to chemical or solvent action. Furthermore, fiber formation is relatively easy with cellulose triacetate.

Where it is desired to separate organic components from fluids, the following illustrative materials (which are generally hydrophobic in character) are suitable: synthetic linear polyamides, polycarbonates, polyvinyl chloride and its copolymers, polyvinylidene chloride and its copolymers, acrylic ester polymers, organic silicone polymers, polyurethanes, polyvinyl formals and butyrals, or mixtures thereof, methacrylate polymers, styrene polymers, various other polyolefins or polyesters or mixtures thereof, as well as various acrylonitrile polymers and cellulose derivatives, particularly mixed ether-esters, which are adequately hydrophobic in character for many applications.

Any suitable materials from the foregoing lists, as well as other suitable hollow fiber forming materials may be utilized according to the present invention for other separatory procedures including selective separation of nonionic immiscible or soluble fluid components, etc., as set forth in detail hereinafter.

Where the hollow fiber membranes are used in ion exchanging or the like separatory procedures, the reagent or reagents necessary to produce the desired ion exchange or similar separation are preferably incorporated into the fiber-forming polymeric material prior to its formation into hollow fibers. In many instances, of course, treatment of the preformed hollow fibers with liquids or by other means to convert it to ion exchange material will provide suitable selectively permeable membranes.

Fine, continuously hollow fibers of the type suitable for use in practice of the invention can be prepared, depending upon the fiber-forming material employed, by melt, dry (or evaporative) and wet spinning procedures using spinnerettes of a design that is apt for the purpose or by other techniques, as will occur to those who are skilled in the art. Such hollow fibers may be formed in accordance with the teachings of British patent 514,-638. For example, fine hollow fibers of cellulose triacetate are readily produced by a wet spinning process in which the cellulose triacetate is first dissolved in a suitable solvent to form a viscous spinning solution; after which the spinning solution is extruded into a coagulant bath through the annular space in a small annular orifice (or spinnerette). The extruded fiber coagulates or gels in the desired form of a continuously hollow, uniform-walled tube. Prior to use, the cellulose triacetate hollow fiber is washed free of solvent in a suitable bath for the purpose, advantageously one that is aqueous in nature or which consists of water. It is usually expedient to take up the hollow fibers on a reel or other suitable means for collection prior to their assembly in the cells utilized in practice of the invention.

Referring back to the rate transfer equation discussed above, it is apparent from consideration thereof that the smaller the wall thickness of the fiber, the less the resistance and the greater the transfer rate. Of course, the wall thickness must be sufficient to withstand the operational pressures to which the fiber is subject. Therefore, it is obvious that a lesser wall thickness may be used in such low pressure operations as dialysis or osmosis than in such relatively higher pressure operations as reverse osmosis.

The allowable internal pressure for any hollow fiber utilized in practice of the present invention may be calculated according to the following thick wall cylinder formula:

$$\frac{t}{D} = \frac{1}{2}\left[\sqrt{\frac{S+P}{S-P}} - 1\right]$$

wherein $t$ is the wall thickness, $D$ is the inside diameter, $S$ is the allowable hoop stress and $P$ is the internal pressure.

Therefore, for a given allowable hoop stress, the $t/D$ ratio fixes the allowable internal pressure for the hollow fibers, regardless of the diameter. Accordingly, as is readily discernible, hollow fibers of the same $t/D$ ratio will withstand the same internal pressure. Thus, the smaller the diameter of the fiber, the smaller the corresponding wall thickness that is necessary and the lower the resistance to permeation.

The optimum dimensions for the hollow fibers will vary somewhat according to the particular process in which they are utilized and will also vary somewhat according to the tensile strength of the fiber forming material.

In general, the uniform wall thickness of the fibers should be held to the limits of between about one-third to about one-eighth of the outside diameter of the hollow fiber. Also, in general, the hollow fibers should be able to withstand a minimum pressure of at least about 100 pounds per square inch. In accordance with the above-noted parameters of rate transfer, the maximum outside diameter of the hollow fibers should, advantageously, not exceed 300 microns. In fact, a more advantageous range of outside diameter is from about 10 to about 50 microns. The uniform wall thickness of the hollow fibers may range from a minimum of about 1 micron to a maximum of about 80 microns. Decrease or increase from the specified limits will lead to an increased chance of rupturing on the minimum side and to a decrease in mass transfer rate on the maximum side.

The most advantageous range of wall thickness of the hollow fibers for most purposes is from about 2 to about 15 microns, with a generally suitable and desirable working range of from about 1 to about 50 microns.

As is apparent, the satisfactory ranges of dimensions for use encompass hollow fibers that, in actuality, are many times smaller than human hair. Prior hereto, hollow fibers of such minute dimensions have never been utilized for commercial purposes. The minimal dimensions of the hollow fibers used in practice of the invention allow the formation of bundles of unsupported hollow fibers which, as has been indicated, increase the mass transfer rate for a given cubic volume of permeability apparatus many times that of prior art devices.

Regardless of the specific dimensional parameters of the fibers involved in any hollow fiber bundle used in accordance with the present invention, the transfer area of the bundles (or of a plurality of bundles assembled in cells) may be reckoned in ways analogous to that illustrated in the following calculations, using for purposes of illustration hollow fibers having an outer diameter (O.D.) of 13 microns, an inner diameter (I.D.) of 9 microns, a wall thickness of 2 microns, a length of 1 foot and a cylindrical bundle size of 1 inch diameter:

| | Transfer Area | Installation "A" | Installation "B" |
|---|---|---|---|
| 1 | Fiber spacing in bundle | 2×O.D. | 1.5×O.D. |
| 2 | Number of fibers in bundle | 8.65×10⁵ | 1.54×10⁶ |
| 3 | Transfer area per bundle | 80 ft.² | 142 ft.² |
| 4 | Bundle spacing in cell | 2×O.D. | 1.5×O.D. |
| 5 | Total transfer area per unit volume of cell | 3,300 ft.²/ft.³ | 10,500 ft.²/ft.³ |

As has been indicated in the foregoing, the total transfer area per unit volume available from a flat membrane assembly (assuming a 1 millimeter unsupported membrane spacing) is about 305 ft.²/ft.³.

It should be further emphasized that the absence of support of the bundles of hollow fibers except at their extreme terminal portions and the uniformity of dimensions throughout the fiber length provide a system in which there is present a uniform pressure gradient along each minuscule portion of the longitudinal area of the individual hollow fibers. This insures a maximum uniform transfer rate along the entire length and an absence of localized rupture forces.

The system and separatory procedure of the present invention is successfully applicable to a wide range of separating operations. A few such applications actually accomplished are illustrated in the following tabulation. In each instance, for purposes of uniform operation and to aid in comparison, the tests were conducted using a single 350 fiber bundle of cellulose triacetate fibers, each of which had an outside diameter of about 45 microns and a wall thickness of about 10 microns. The yield of permeate obtained in each of the listed illustrations is that obtained from the entire fiber bundle.

*Illustration 1*

| | |
|---|---|
| Material | Apple cider. |
| Osmotic pressure | 380–400 p.s.i. |
| Applied pressure | 425 p.s.i. |
| Permeation rate | 0.05 cc./hr. |
| Permeate | White, negative for sugar, refractive index=distilled water. |

*Illustration 2*

| | |
|---|---|
| Material | Coffee. |
| Osmotic pressure | 90 p.s.i. |
| Applied pressure | 210 p.s.i. |
| Permeation rate | 0.07 cc./hr. |
| Permeate | Substantially only water; no odor; no residue on evaporation. |

*Illustration 3*

| | |
|---|---|
| Material | Orange juice. |
| Osmotic pressure | 200 p.s.i. |
| Applied pressure | 380 p.s.i. |
| Permeation rate | 0.07 cc./hr. |
| Permeate | Substantially only water; very slight trace of sugar. |

*Illustration 4*

| | |
|---|---|
| Material | 2 percent $CuSO_4$ solution. |
| Osmotic pressure | 85 p.s.i. |
| Applied pressure | 230 p.s.i |
| Permeation rate | 0.5 cc./hr. |
| Permeate | Water white; rejection factor 99.4 percent Cu. |

*Illustration 5*

| | |
|---|---|
| Material | 2 percent $NH_4NO_3$. |
| Osmotic pressure | 175 p.s.i. |
| Applied pressure | 320 p.s.i. |
| Permeation rate | 0.16 cc./hr. |
| Permeate | 98.4 percent rejection of both $NH_4$ and $NO_3$. |

*Illustration 6*

| | |
|---|---|
| Material | 2 percent glycine. |
| Osmotic pressure | 65 p.s.i. |
| Applied pressure | 215 p.s.i. |
| Permeation rate | 0.9 cc./hr. |
| Permeate | 60 percent rejection glycine. |

*Illustration 7*

| | |
|---|---|
| Material | 70 percent styrene/30 percent butadiene latex having average particle size of about 0.3 micron, diluted to 5 percent solids. |
| Osmotic pressure | 40 p.s.i. |
| Applied pressure | 260 p.s.i. |
| Permeation rate | 0.8 cc./hr. |
| Permeate | Water white; turbidity test indicating 99 percent rejection of latex. |

*Illustration 8*

Permeation tests were conducted on aqueous sodium chloride solutions using both a bundle of relatively large, thick-walled fibers having a relatively low permeation rate and a larger bundle of small, thinner-walled fibers. The results were as follows:

(1) Permeation test with relatively large, thick-walled fibers giving low permeation rate:

(a) Number of fibers ______ 9.
(b) Outside diameter ______ 290 microns.
(c) Inside diameter ______ 150 microns.
(d) Length ______ 8 inches.
(e) Feed solution ______ 1 percent NaCl.
(f) Osmotic pressure ______ 100 p.s.i.
(g) Applied pressure ______ 300 p.s.i.
(h) Permeation rate ______ 0.002 cc./hr.
(i) Permeate ______ 97 percent rejection of NaCl.

(2) Permeation test with a larger bundle of small, thin-walled fibers:

(a) Number of fibers ______ 1500.
(b) Outside diameter ______ 48 microns.
(c) Inside diameter ______ 32 microns.
(d) Length ______ 30 centimeters.
(e) Feed solution ______ 1 percent NaCl.
(f) Osmotic pressure ______ 100 p.s.i.
(g) Applied pressure ______ 520 p.s.i.
(h) Permeation rate ______ 1.48 cc./hr.
(i) Permeate ______ 97 percent rejection of NaCl.

Numerous additional illustrations are available to show the efficiency of the systems of the present invention and the significant benefit and advantage to be obtained in its practice.

Besides the above illustrations, numerous dialytical operations can be performed satisfactorily using the system of the present invention.

The following is set forth as a specific illustration of such operation:

*Illustration 9*

Caustic soda (NaOH) is recovered from a viscose press liquor using, as a feed solution to pass through the hollow fibers a liquor containing 16.5–17 weight percent NaOH and 1.5–2.5 weight percent hemicellulose. The fiber bundle employed is made of cellulose triacetate and contains about a million individual hollow fibers each having dimensional parameters equivalent to those described in the second part of the foregoing illustration. The feed liquor is forced through the fibers under a forced pressure of about 100 p.s.i. The diffusate collected outside the fibers contains about 8–9 weight percent NaOH and only about 0.06–0.08 weight percent hemicellulose.

While it is difficult to correlate completely the significant test results of the systems of the present invention relative to the prior art systems, it may be stated generically that comparative dialysis tests based upon the same time period indicate that the systems of the invention are much more efficient and satisfactory than prior art devices and procedures.

It should be noted that, in each of the above exemplifying illustrations, the pressure used as driving force was only slightly higher than the inherent osmotic pressure. Further experiments following each of the illustrations set forth have provided the same general results as the results obtained in the saline water separation discussed above. Thus, at least the same quality permeate is obtained, regardless of fluid system being separated, when greater driving forces are utilized.

The systems of the present invention may be applied successfully to the following general types of separatory operations, some of which include those specifically illustrated above:

I. Separation of the components of aqueous saline solutions:
  A. With osmotic hollow fibers:
    1. Recovery of water from saline solutions:
      a. Desalting sea water.
      b. Desalting brackish waters.
    2. Recovery of salts from saline solutions:
      a. Recovery of sodium chloride and/or minor constituents from sea water.
      b. Recovery of salts from other brines including solutions of alkali metal and alkaline earth halides, carbonates, sulfates, borates and the like, such as KCl, KBr, NaCl, $Na_2CO_3$, $Na_2SO_4$, $Na_2B_4O_7$, $Na_3PO_4$, NaBr, NaF, and $CaCl_2$.
    3. Concentration of industrial saline and other chemical solutions, including caustic (i.e., NaOH, KOH, etc.), ammonium and nitrate fertilizers, leach liquors, including uranium and rare earth salts, orthophosphoric acid, sodium phosphates, copper sulfate (i.e., $CuSO_4$), monosodium glutamates, sodium thiosulfates, sodium chromates, sodium chlorates, lithium carbonate, alum, aluminum sulfates, ammonium chloride, ammonium nitrate and the like.
    4. Industrial separations, including concentration of heavy water, glycerine, lactic acid, tanning extracts, alcohol, hydrogen fluoride, glycols and so forth.
  B. With hollow fibers having ionic group substitution attachments:
    1. Ion exchange processes, including:
      a. Water softening (i.e., exchanging $Na^+$ for $Ca^{++}$, etc.).
      b. Anionic softening.
      c. Recovery of magnesium from sea water.
      d. Recovery of caustic (NaOH) from lime (CaO) and salt (NaCl).
    2. Ion exclusion coupled with reverse osmosis, including:
      a. NaCl from glycerine.
      b. Demineralization of $H_2O$ or any other nonionic solvent of low molecular weight.
      c. All separatory procedures listed above for ionic materials with osmotic fibers and a reverse osmosis process may also be accomplished using ionic filters.

II. Separation or concentation of heat sensitive materials, regardless of ionic components:
  A. Biological:
    1. Medical:
      a. Artificial kidney.
      b. Sterile solutions.
      c. Isolation of virus or bacteria.
      d. Fractionation of blood.
      e. Serum production.
    2. Pharmaceuticals:
      a. Concentration or separation of alkaloids, glucosides, hormones, vitamins, vaccines, amino acids, antisera, antiseptics, proteins, organo metallic compounds, antibiotics.
      b. Continuous fermentation.
  B. Food industries:
    1. Concentration of natural fruit and vegetable juices including: orange, grapefruit, grape, apple, tomato, carrot, cabbage, celery, etc.
    2. Concentration of sugar solutions.
    3. Beverage concentration, including milk and extracts of: coffee, tea, etc.

III. Selectively permeable separation of organic matters:
  A. Separation of materials which normally azeotrope:
    1. Alcohol-water solutions.
    2. Ethanol-isopropanol-water ternary azeotropes.
  B. Close boiling mixtures, such as meta- and para-xylenes, and the like.
  C. Recovery of solvents from organic solution.
  D. Organic contaminant removal from ethanol or propanol oxide streams.
  E. Petroleum fractionation.
  F. Separation of amomnia ($NH_3$) values from organic amines.

IV. Processing of industrial waste streams, including wastes from radioactive materials, sulfite pulps, fissionable cannery wastes, etc.

V. Dialysis:
  A. Recovery of caustic from viscose or mercerizing solutions.
  B. Recovery of acids from metal treating processes.
  C. Starch-dextrine conversion.
  D. Skimmed milk concentration.
  E. Removal of salt from sugar solutions.
  F. Blood dialysis of artificial veins, arteries, etc.

The foregoing list of applications of the systems of the present invention is not nor is it intended to be, nor should it be construed as being, all-inclusive. Rather this list represents those commercial procedures to which the present invention can be successfully applied. Obviously, the teachings of this invention may also be successfully applied to other procedures wherein a permeability separatory apparatus of the presently contemplated variety may be of utility. In like fashion, the teachings of this invention may also be successfully applied for making units adapted to use in other procedures wherein such permeability separatory apparatus of the presently contemplated variety may be of utility.

What is claimed is:

1. A permeability separatory apparatus including a permeable membrane cell having positioned therein a multiplicity of bundles of continuously hollow, selectively permeable, fine fibers having terminal portions, supporting means for each of said fibers within each said bundle at said terminal portions only, each of said fibers being substantially unsupported throughout its length between said terminal portions, each of said bundles consisting of a multiplicity of the said fibers.

2. A permeability separatory apparatus including a permeable membrane cell having positioned therein a multiplicity of bundles of continuously hollow, selectively permeable, fine fibers having terminal portions, supporting means for each of said fibers within each said bundle at said terminal portions only, each of said fibers being substantially unsupported throughout its length between said terminal portions, each of said hollow fibers having a substantially uniform bore therethrough open at one end to ingress of untreated fluid and open at the opposite end to treated fluid egress, each of said bundles consisting of a multiplicity of the said fibers.

3. A permeability separatory apparatus including a permeable membrane cell having positioned therein a multiplicity of bundles of substantially parallel, continuously hollow, selectively permeable, fine fibers having terminal portions, supporting means for said fibers within said cell at said terminal portions only, said fibers being substantially unsupported throughout their lengths between said terminal portions, each of said hollow fibers having a substantially uniform bore therethrough open at one end to ingress of untreated fluid and open at the opposite end to treated fluid egress, means to apply fluid pressure to a fluid contained within said fibers, each of said bundles consisting of a multiplicity of the said fibers.

4. A permeability separatory apparatus including a permeable membrane cell having positioned therein a multiplicity of bundles of substantially parallel, continuously hollow, selectively permeable, fine fibers having terminal portions, supporting means for said bundled multiplicity of fibers within said cell at said terminal portions only, said bundled multiplicity of fibers being substantially unsupported throughout its length between said terminal portions.

5. A permeability separatory apparatus including a permeable membrane cell having positioned therein a multiplicity of bundles of substantially parallel, continuously hollow, selectively permeable, fine fibers having terminal portions, supporting means for said bundled multiplicity of fibers within said cell at said terminal portions only, said bundled multiplicity of fibers being substantially unsupported throughout its length between said terminal portions, said bundled multiplicity of hollow fibers having coupling members cementitiously adjoined to said terminal portions in fluid-sealing relation.

6. A permeability separatory apparatus comprising a permeability cell, means to feed untreated fluid having selectively permeable components to said cell, means to collect treated fluid from said cell, means to collect the fluid component permeated through said cell, said permeability cell having positioned therein a multiplicity of bundles of substantially parallel, continuously hollow, fine fibers having terminal portions, means to support said fibers in each of said bundles at said terminal portions only, each of said bundles consisting of a multiplicity of the said fibers.

7. The apparatus of claim 6, wherein said fibers have an outside diameter between about 10 and about 50 microns.

8. The apparatus of claim 6, wherein said fibers have an outside diameter of less than about 300 microns.

9. A permeability separatory apparatus comprising means to feed untreated fluid having selectively permeable components, a first header means in communication with said feed means, said header means having an end plate with a passage therethrough, a casing supporting said first header and supporting a second header means having a second end plate with a second aligned passage therethrough, a multiplicity of bundles of selectively permeable, continuously hollow, fine fibers positioned within said casing, said hollow, fine fibers having open, opposite terminal portions and means to mount said bundle with said terminal portions extending through said passages in fluid sealed relation to said header plates.

10. A permeability apparatus for separating water from sea water by reverse osmosis comprising, a feed means for sea water, a first pump fluid connected to said feed means, a second pump fluid connected to the output of said first pump, a permeability cell fluid connected to the output of said second pump, a multiplicity of bundles of selectively permeable, continuously hollow fibers having terminal portions, means to position said bundles within said cell with said bundles supported at their terminal portions, a turbine fluid connected to the treated brine effluent output of said permeability cell and having an output shaft, and means mechanically connecting said shaft to said first pump in driving relation.

11. A permeability, separatory process comprising passing a fluid having a plurality of components into contact with the interior walls of a multiplicity of bundles of open ended, continuously hollow, fine fibers which are permeable to at least one of the fluid components while supporting each of said fibers at its terminal portions only, whereby a uniform pressure gradient is obtained throughout the unsupported length of said fiber, each of said bundles consisting of a multiplicity of the said fibers.

12. A permeability, separatory process comprising passing a fluid having a plurality of components into contact with the interior walls of a multiplicity of bundles of open ended, continuously hollow, fine fibers which are permeable to at least one of the fluid components while supporting said fibers at the terminal portions thereof only, and applying a pressure in excess of osmotic pressure to said fluid whereby a uniform reverse osmotic pressure gradient is obtained throughout the unsupported length of said fibers each of said bundles consisting of a multiplicity of the said fibers.

13. A permeability, separatory process comprising passing a fluid having a plural number of components including ionic constituents into contact with the interior walls of a multiplicity of bundles of open-ended, continuously hollow, fine fibers which are permeable to at least one of the fluid components and which contain ion-exchanging constituents therein while supporting said fibers at the terminal portions thereof only, and applying a pressure in excess of osmotic pressure to said fluid whereby a uniform reverse osmotic pressure gradient is obtained throughout the unsupported length of said fibers and ionic constituents in said fluid are exchanged on said ion exhanging constituents in said fiber.

14. A dialysis process comprising passing a caustic liquor into contact with the interior walls of a multiplicity of bundles of open ended, continuously hollow, fine fibers which are permeable to the solvent in said caustic liquor while supporting said fibers at the terminal portions thereof only and applying a pressure to said caustic liquor whereby it is dialyzed throughout the unsupported length of said fibers each of said bundles consisting of a multiplicity of the said fibers.

15. A permeability process for separating water from saline sea water comprising applying pressure to the sea water by means of a pump, said pressure being applied in excess of the osmotic pressure, passing the pressurized fluid from said pump through the interiors of a multiplicity of bundles of parallel fluid connected continuously hollow, fine fibers, and collecting the water which permeates through the walls of said fibers, each of said bundles consisting of a multiplicity of the said fibers.

16. A permeability process for separating water from saline sea water comprising applying pressure to the sea water by means of a pump, said pressure being applied in excess of the osmotic pressure, passing the pressurized fluid from said pump through the interiors of a multiplicity of bundles of parallel, fluid connected, continuously hollow, fine fibers, collecting the water which permeates through the walls of said fibers, and utilizing the kinetic energy of the treated waste effluent which has passed through said fiber interiors to motivate said pump.

17. A permeability separatory element comprising a bundle of thin, substantially parallel, continuously hollow, semipermeable fibers each having two opposite terminal portions, a first coupling member surrounding the first of said terminal portions, a second coupling member surrounding the second of said terminal portions, and means joining the exteriors of said fiber terminal portions to each other and to said coupling members in fluid sealing relation.

18. The structure set forth in claim 17, wherein each of the said hollow fibers have an outside diameter of from about 10 to about 50 microns.

19. The structure of claim 17, wherein each of the said hollow fibers have an outside diameter of from about 10 to about 50 microns and a wall thickness of from about 2 to about 15 microns.

20. The structure of claim 17, wherein the means joining said exterior terminal portions to each other and to said coupling members consists of a cementitious, organic, settable material.

21. The structure of claim 17 wherein each of said hollow fibers is formed from cellulose triacetate.

22. A permeability separatory element comprising a bundle of thin, substantially parallel, continuously hollow, semipermeable fibers, each of said fibers having two opposite exterior terminal portions, a first coupling member having a bore extending therethrough and forming an inner wall, a second coupling member having a second bore extending therethrough and forming a second inner wall, each of said first fiber terminal portions being positioned within the first of said bores within said first coupling member, each of said second fiber terminal portions being positioned within the second of said bores within said second coupling member, and means joining the exteriors of said first terminal portions to each other and to said first wall and the exteriors of said second terminal portions to each other and to said second wall in fluid-sealing relation.

23. A process of forming a permeability separatory element comprising the steps of: assembling a bundle of a plurality of continuously hollow, semipermeable thin fibers of substantially equal length; positioning a coupling member having an end wall and an inner wall in surrounding relation to said end portions with said end portions projecting beyond said end wall; and cementing with settable cementitious material the exteriors of said fibers to each other and to said inner wall in fluid-sealing relation.

24. The process of claim 23 including, in combination therewith, the additional step of severing the portions of said fiber ends which project beyond said end wall.

25. The process of claim 23 including, in addition thereto and in combination therewith, the steps of filling at least the terminal interior portions of said hollow fibers with a removable material prior to said cementing step and removing said removable material thereafter.

26. A process of forming a permeability separatory element comprising the steps of: assembling a bundle of a plurality of continuously hollow, semipermeable thin fibers of substantially equal length with their end portions in substantially coplanar relation; positioning a coupling member having an end wall and an inner wall in surrounding relation to said end portions with said end portions projecting beyond said end wall; cementing with settable cementitious material the exteriors of said fibers to each other and to said inner wall in fluid-sealing relation; and severing the portions of said ends which project beyond said end wall; and wherein said ends of said fibers are positioned with the end portions projecting beyond said end wall a distance greater than the distance which the cementitious material penetrates the interiors of said hollow fibers.

27. A process of forming a permeability separatory element comprising the steps of: assembling a bundle of a plurality of continuously hollow, semipermeable thin fibers of substantially equal length with their end portions in substantially coplanar relation; then casting a coupling member for said fiber bundle of a castable material about the end portions of said fiber bundle so as to surround and embed said end portions of said fiber bundle in said coupling member in fluid-sealing relation.

References Cited by the Examiner

UNITED STATES PATENTS

| | | | |
|---|---|---|---|
| 2,411,238 | 11/1946 | Zender | 210—22 |
| 2,687,997 | 8/1954 | Marchand | 210—231 |
| 2,864,506 | 12/1958 | Hiskey | 210—23 X |
| 2,972,349 | 2/1961 | DeWall | 128—214 |

OTHER REFERENCES

Best, "Physiological Basis of Medical Practice," Sixth ed., The Williams and Wilkins Co. (Baltimore), 1955, chapter 35, kidney structure.

Carman, "Resistance of Tubes to Collapse," University of Illinois Engineering Experiment Station, bulletin No. 5, June 1906, pp. 1–26, pp. 12–17 particularly relied on.

"Fresh Water from the Ocean," The Ronald Press Co., New York (1954) pp. 105–109.

"Separation and Purification" part I, vol. III, 2nd ed., Interscience Publishers, Inc. (1956) pp. 713–718 and 721–723.

MORRIS O. WOLK, *Primary Examiner.*

CARL F. KRAFFT, *Examiner.*